June 8, 1943.  C. E. HATHAWAY  2,321,061
VALVE GEAR
Filed Jan. 28, 1941  5 Sheets-Sheet 1
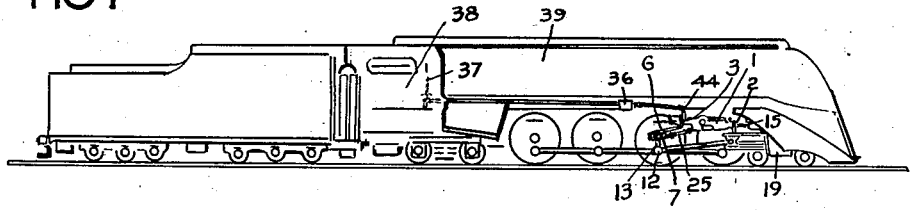
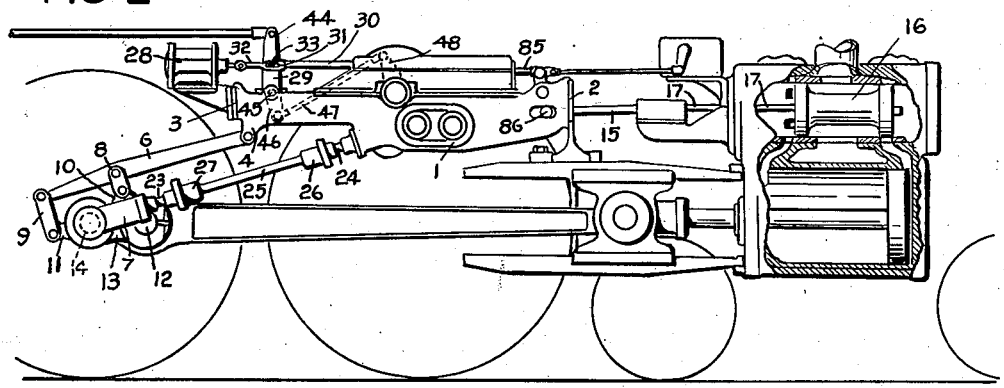
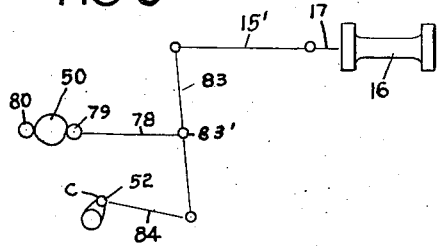
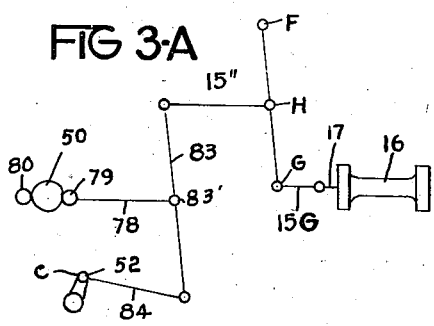
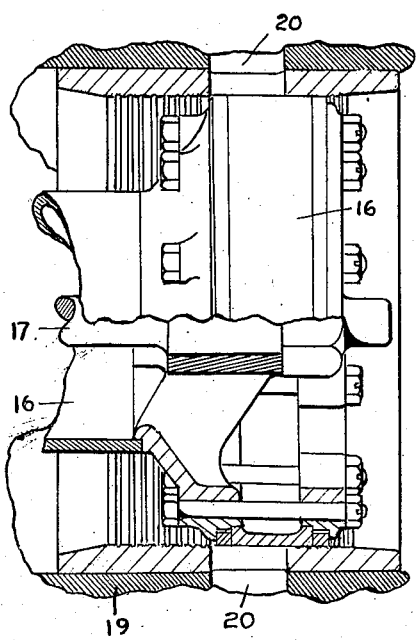
INVENTOR.
CHARLES E. HATHAWAY.
BY
ATTORNEYS June 8, 1943.  C. E. HATHAWAY  2,321,061
VALVE GEAR
Filed Jan. 28, 1941   5 Sheets-Sheet 2
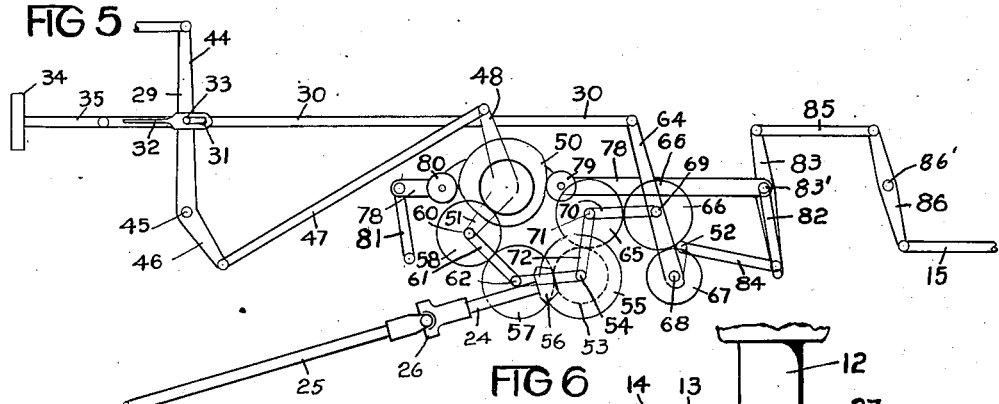
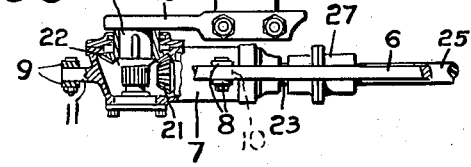
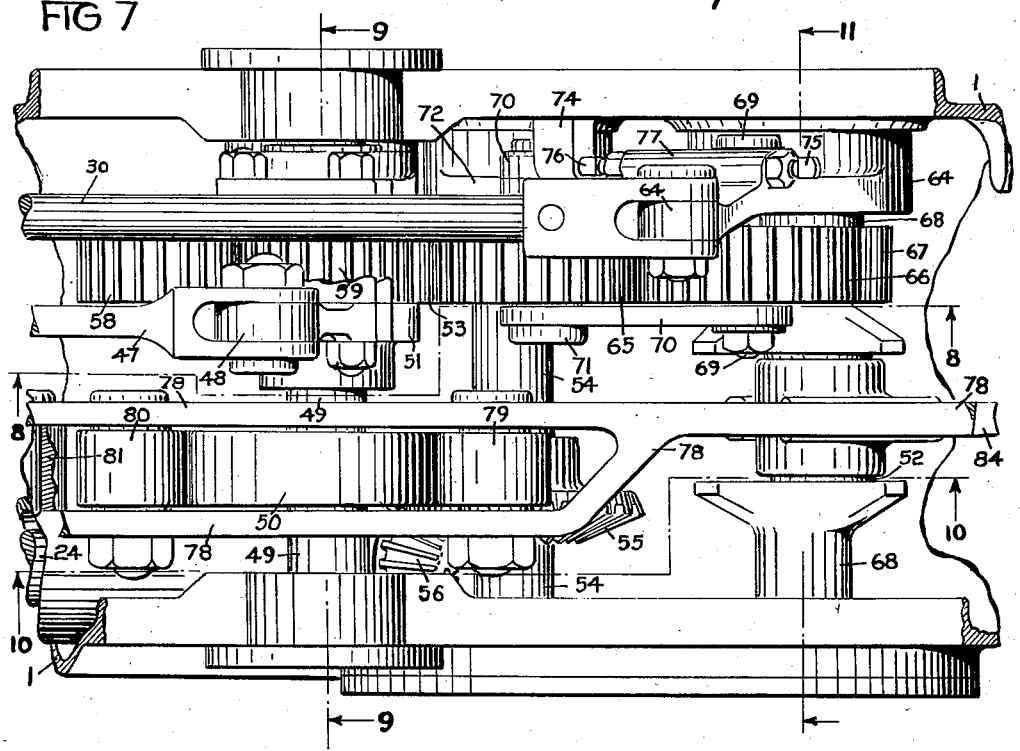
INVENTOR.
CHARLES E. HATHAWAY.
BY
ATTORNEYS June 8, 1943.  C. E. HATHAWAY  2,321,061
VALVE GEAR
Filed Jan. 28, 1941      5 Sheets-Sheet 3
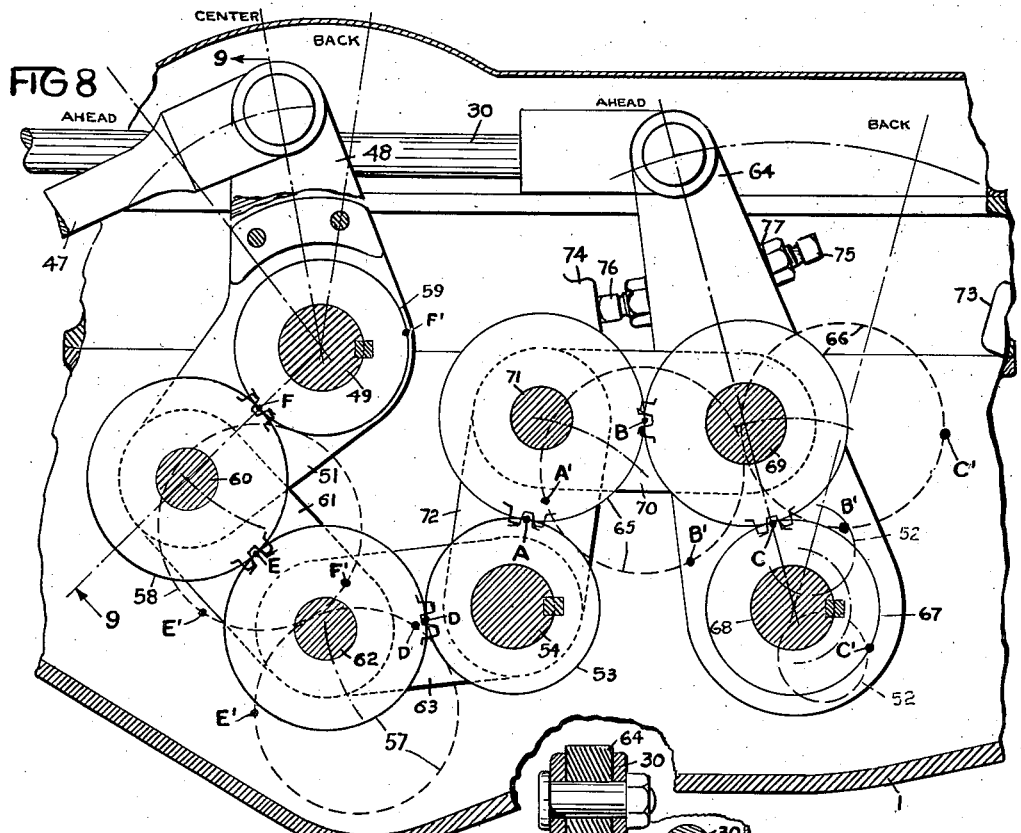
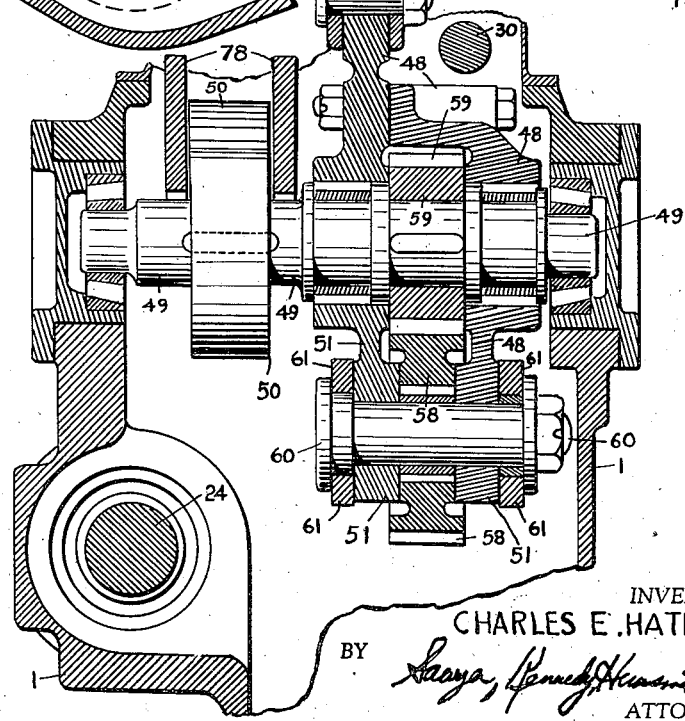
INVENTOR.
CHARLES E. HATHAWAY.
BY
ATTORNEYS June 8, 1943.    C. E. HATHAWAY    2,321,061
VALVE GEAR
Filed Jan. 28, 1941    5 Sheets-Sheet 4
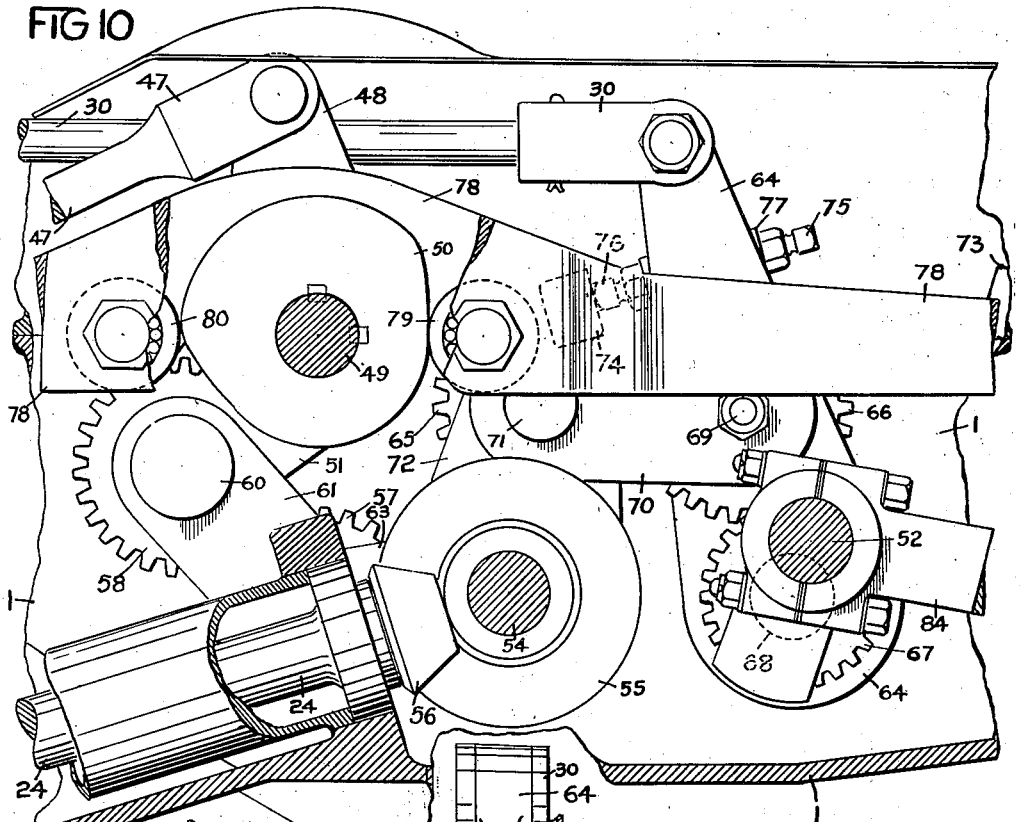
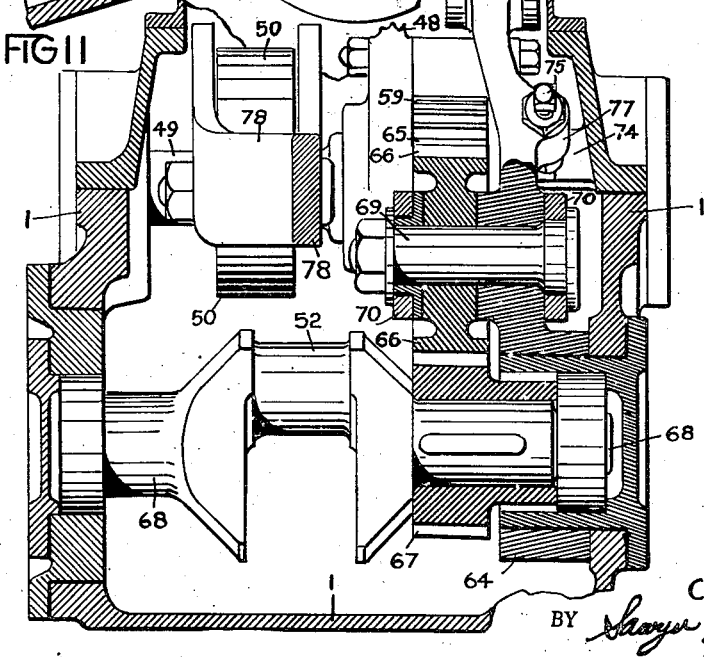
INVENTOR.
CHARLES E. HATHAWAY.
BY
ATTORNEYS

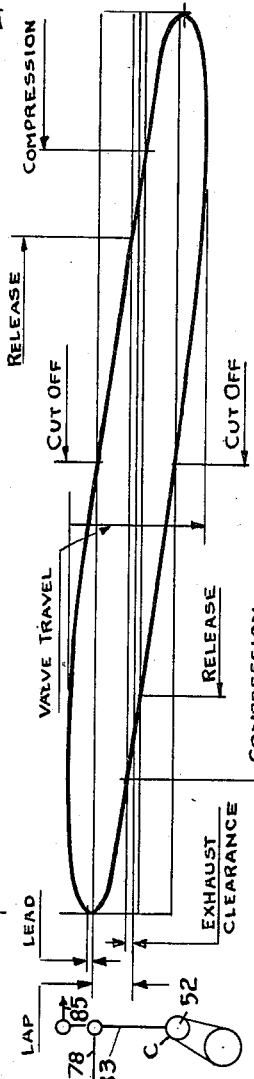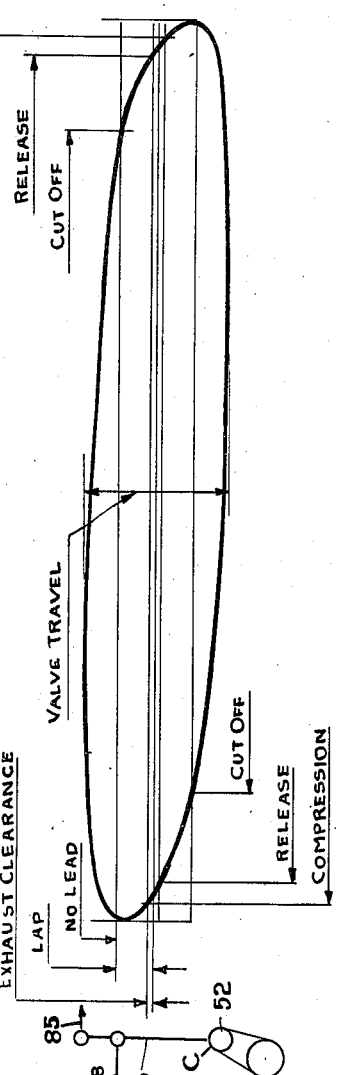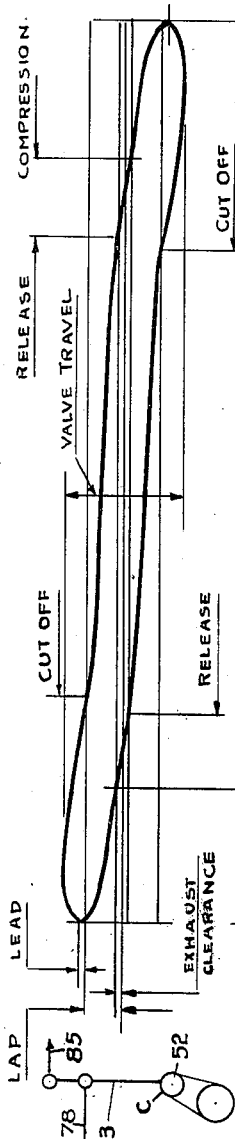

Patented June 8, 1943

2,321,061

UNITED STATES PATENT OFFICE 2,321,061

VALVE GEAR

Charles E. Hathaway, New York, N. Y.; Desdemona B. Hathaway, administratrix of said Charles E. Hathaway, deceased Application January 28, 1941, Serial No. 376,383

18 Claims. (Cl. 121—165)

This invention relates to valve gear for steam engines and more particularly to valve gear for use with piston valves of the type used with locomotives.

It is an object of the invention to increase the efficiency of steam engines and this may be achieved by increasing port opening at early cut-offs, by increasing the speed of opening and closing of the valve at early cut-offs, by decreasing the lead at full gear cut-off, and by avoiding early release and compression at early cut-offs. Summarizing the foregoing objects it may be said that it is an object of the invention to provide a means and method of distributing steam by which the valve events may be improved and by which the regulation of the valve events is also improved.

Considering now the valve action in itself, it is an object of the invention to improve the valve action and this improvement may take the form of a shortening of the valve travel and the production of a constant, or very nearly constant, travel with the consequent advantages in lubrication resulting from the elimination of large areas which are unlubricated at early cut-offs and must be swept across by the valve piston at later cut-offs.

From the standpoint of the valve gear itself it is an object of the invention to provide a gear which may be enclosed within a casing or housing so that the parts are protected from foreign matter, dust and cinders and may be flooded with oil. A further object is to provide a valve gear unit or assembly which may readily be removed and replaced for repairs. Again, it is an object of the invention to provide valve gear requiring but little effort to vary the cut-off or reverse the engine, and to provide a valve gear which is not affected by misalignment of the main pin or main axle, by variation of the length of the main rod, by roll of the engine or high or low wheels, or by the expansion of the engine frame.

As will be apparent to those skilled in the art the full or partial attainment of any of the foregoing objects is desirable in itself, apart from the remainder. Accordingly, the foregoing recital of objects is intended as illustrative rather than limiting. These objects are all obtained in the embodiment chosen by way of example, but it will be understood that the invention can be employed, where desired, so as to obtain some of the foregoing objects and not others, and even to obtain such objects partially, while still realizing important advantages over conventional valve gears.

With the foregoing and still further objects which will appear in the description in mind, the invention consists in the combinations and arrangements of parts, details of construction, and methods of operation, which will now be described fully in connection with the accompanying drawings and then pointed out more particularly in the appended claims.

In the drawings:

Fig. 1 is a side elevation of a locomotive showing the application of my valve gear thereto according to a preferred embodiment;

Fig. 2 is a side elevation of the valve operating mechanism;

Figs. 3 and 3A are diagrammatic views showing modifications of the valve stem connections;

Fig. 4 is a fragmentary detail of a piston valve;

Fig. 5 is a diagrammatic view showing the movable elements;

Fig. 6 is a fragmentary plan view of the driving gears and their connection to the main pin;

Fig. 7 is a fragmentary plan view;

Fig. 8 is a fragmentary section at 8—8, Fig. 7;

Fig. 9 is a fragmentary section at 9—9, Fig. 7;

Fig. 10 is a fragmentary section at 10—10, Fig. 7;

Fig. 11 is a fragmentary section at 11—11, Fig. 7;

Figs. 12 and 12A are diagrammatic views of the cam as related to the crank and the corresponding valve ellipse at 25% cut-off;

Figs. 13 and 13A are diagrammatic views of the cam as related to the crank and the corresponding valve ellipse at 50% cut-off;

Fig. 14 and 14A are diagrammatic views of the cam as related to the crank and the corresponding valve ellipse at about 87% cut-off, or full gear in the example selected as illustrative.

Similar reference characters refer to similar parts throughout the several views of the drawings and in the specifications to follow.

While I have herein described and illustrated in detail one of the preferred constructions of my valve gear so that it may be better understood, I do not wish to be limited to these details of construction, as those skilled in the art to which my invention pertains, after a study of this disclosure, can readily see that it may be modified to suit the operation of various engine valves without departing from the underlying principles embodied in the construction herein disclosed. This is especially true in view of the employment of mechanical movements new in the art and the production of valve cycles which are new in principle. For instance, the size of the parts may be varied to suit the type of valve which is to be operated by my valve gear.

General features of operation

This invention contemplates the use of two mechanical movements which may be identified for convenience of discussion as $M^1$ and $M^2$ and which are combined to produce the desired motions of the valve stem. Typically, one of these movements, say $M^1$, will be in the nature of a cam movement and characterized by some or all of the following features: Shortness of travel, and rapid acceleration and deceleration during parts of the movement with long dwells or intervals of substantially no movement between the periods of acceleration and deceleration. $M^2$, on the other hand, will be typically in the nature of a crank or eccentric movement and characterized by relatively long travel and approximately harmonic character. By superposing the $M^1$ movement upon the $M^2$ movement or combining the two together the desired composite movement of the valve rod is provided.

Alteration of the relative positions of the parts producing the respective $M^1$ and $M^2$ movement is utilized to vary or control the valve events and it should be noted that with this method of controlling the valve events the valve movement may be adjusted for short, medium, or late cut-off, without any substantial change in the travel of the valve, since the regulation of the valve events is achieved by accelerating and decelerating the valve rod during its movement between substantially fixed limits. The operation of the engine is conveniently controlled by adjusting the $M^1$ movement so as to control the cut-off and adjusting the $M^2$ movement to effect reversal. By employing adjustable stops, or the like, to limit the extent of adjustment of the $M^2$ movement, the desired lead may be obtained and this in turn may be varied as desired at selected cut-offs by relative adjustment of a suitable $M^1$ movement.

In the specific construction later described, the valve events are controlled and reversal is effected through altering the driving relation between the engine and the $M^1$ and $M^2$ movements. As is readily apparent, however, such regulation may be achieved within the invention in its less limited aspect by employing adjustable parts in the $M^1$ and $M^2$ movements themselves, or by altering their driving relation to the valve stem.

The cam and crank employed to produce the respective $M^1$ and $M^2$ movements according to the disclosure of the present application are illustrated schematically in Figures 12, 13 and 14 which show the cam and crank without the attendant driving mechanism or mechanism connecting the same to the valve stem. These figures show the shape of a suitable cam and the relation between it and a suitable crank at various cut-offs. As there shown, the cam comprises a substantially concentric high portion U and low portion V, opposite each other and occupying about 120° of arc, and rising and falling portions W and X between the portions U and V and each occupying about 60° of arc. Such a cam provides relatively rapid movements when the portions W and X are engaging the cam rollers 79 and 80 and relatively long dwells in which substantially no movement occurs when the concentric portions U and V are engaging the rollers. The cam will ordinarily be designed to produce a relatively short travel of the order of 20% of the desired valve stem travel. The crank movement, also shown schematically in Figures 12, 13 and 14 requires no special explanation.

In Fig. 12 the parts are shown in the relative positions which they occupy when adjusted for 25% cut-off and it will be observed that the point $U^1$ is in contact with the right hand cam roller at a time when the crank or main pin is at the limit of its stroke (Fig. 12A) and the valve gear crank C is near the middle of its stroke. A medium or late cut-off is provided for by adjusting the relative angular positions of the cam and crank C, or their phase relationship, as shown in Figs. 13 and 14. The valve ellipses obtainable are shown in Figs. 12A, 13A and 14A, which correspond respectively to cam and crank diagrams of Figs. 12, 13 and 14.

The invention is of particular importance in sliding valves due to the advantages in lubrication obtained and also due to the fact that the superposition of a relatively small regulatory movement in the nature of a cam movement on the relatively large reciprocating movement makes it possible to obtain very satisfactory regulation of the valve events from the standpoint of engine performance, while preserving mechanical simplicity and reliability in the valve gear. This is particularly true in the case of piston valves which are generally bulky and possess considerable inertia.

The interrelation of the movements $M^1$ and $M^2$ is achieved by trains of gears which may all be placed within a simple gear casing of practical size so as to constitute a sealed unit in which proper lubrication and protection from foreign substances may be had and which is readily interchangeable with other such units, making repairs a very simple matter. In this connection it will be observed from the following specification that the whole unit may be placed within a casing so as to be self-contained except for a single drive shaft, a single connection to the valve rod and two links serving to adjust the two movements.

In advance of detailed description, certain features of the invention will be readily understood from Figs. 12 to 14 and 12A to 14A. In particular: the cut-off adjustment by varying the angular relation of the cam to the crank is apparent; reversal would be effected by turning the crank, with relation to the cam, through an angle, in this case, of about 120°; the lead is in general determined by the limits of this crank adjustment, but may be eliminated at full cut-off, as indicated in Fig. 14A, by suitable design and interrelation of the parts. A brief reference to Figs. 12A to 14A will make clear certain characteristic features of the valve cycles obtainable with the valve gear of the invention. As seen in Fig. 14A, at full cut-off the valve ellipse is not dissimilar in appearance to that produced by certain conventional gears. Even here it will be noted, however, that it is possible to operate with no lead. As the cut-off is reduced, the ellipse progressively approaches the appearance of that of Fig. 12A, in which it will be noted that, instead of the ellipse merely flattening, its ends have, in effect, been swung apart. Even at 25% cut-off the lead is only a small fraction of the travel and the cut-off is relatively sharp.

Valve gear drive connections

The supports of the valve gear, driving connections between the engine, valve and valve gear, framework, and the position of the valve on the engine, as well as the position of the valve gear driving mechanism, may be varied to suit engines of various size and design. In Fig. 1 I have shown a preferred embodiment in which the valve gear case 1, which is oil tight and provides a framework for supporting the various parts housed therein, is secured to the front and rear transverse brackets 2 and 3 which form a part of the locomotive frame. A similar case and parts, except for being right and left, are secured to the other side of the engine and thus are not shown.

The case 1 is provided with lugs 4 (Fig. 2) which receive and swingingly support the front end 5 of a torsion beam 6, movably secured to a driving gear case 7 by front links 8 and rear links 9 which, in turn, are swingingly secured to the case 7 by the lugs 10 and 11. The driving gear case 7 is thus movably connected to the valve gear case 1, permitting the main driver axle of the locomotive to move axially to conform to the rolling of the engine boiler and frame as well as to conform to the irregularities of the track. Misalignment of the cases 1 and 7 is thus provided for so that the valve gear and its movement are not affected.

The main pin 12 is provided with an arm 13 rigidly secured thereto (Figs. 2 and 6) and at its free end the arm 13 is provided with a gear stud 14, Fig. 6, which is in axial alignment with the main axle of the locomotive. Motion is communicated from this gear stud by means of shafting and gearing, later described, to the valve gear within case 1 and ultimately, through valve stem connection 15 at the front of case 1, to the engine valve 16 by means of the valve stem 17 so as to control the flow of steam to or from the engine cylinder 19 by means of the usual ports 20.

Substantially parallel to the torsion beam 6, Figs. 2 and 6, and secured to a bevel pinion 21 which is driven by bevel gear 22 mounted on the stud 14, is a drive shaft 23 journaled within the case 7 and extending through its front end. The shaft 23 is connected to a shaft 24 in the case 1 by means of intermediate shaft 25 and flexible couplings 26 and 27, thereby providing a driving means for the running parts in the case 1.

*Control levers*

For changing the cut-off and reversing the engine, I have provided an air cylinder 28 and lever 29 which is operatively connected to the control valve for the air cylinder in such manner as to cause the movement of the air piston and the parts 30 operated by it only at or near the extreme positions of travel of the lever 29. A slot 31 in air valve stem 32 controlling the air cylinder 28 permits a pin 33 secured to lever 29 to move freely between the ends of said slot. The piston 34 (see Fig. 5) in the air cylinder 28 and its piston rod 35 are connected to change the relation of the crank C to the main pin 12, as hereinafter described.

The lever 29 (see Figs. 1 and 2) may be operatively connected to a power reserve cylinder 36 in the usual manner or may be directly connected to the usual reverse lever 37 in the cab 38 of the locomotive 39. The manual effort required to handle my valve gear may be reduced so far below that required to move ordinary locomotive valve gears that the usual reverse cylinder becomes unnecessary even when operating heavy piston valves. The piston valve 16 may also be constructed lighter than usual because its travel is greatly reduced and is substantially uniform regardless of the cut-off to which it may be set to operate by the lever 37, thereby eliminating the dry unlubricated valve bushing and the resultant friction. The construction of such a light valve is indicated in Fig. 4 of the drawings, which shows one end of the valve, a steam port and a bushing. The other end of the valve is similar.

The lever 37, whether connected directly or through a power reverse cylinder, moves the lever 29 through its upper arm 44. Lever 29 is secured to a rocker shaft 45 which passes laterally across the engine to the valve gear on the opposite side and is attached to a similar lever on the left side of the locomotive associated with the left valve gear. As stated, the valve gears on each side of the locomotive are duplicates, and lever 37 in the cab thus controls both sides simultaneously through the shaft 45.

The lower arm 46 of lever 29 is swingingly connected to one end of a link 47, the other end of which is swingingly connected to a cam lever 48 which in turn is mounted freely on a cam shaft 49, within the casing 1, to which is secured the cam 50. The lever 48, not being secured to the cam shaft, moves or oscillates the cam only through its lower arm 51 on which one of a train of drive gears is mounted, and affects the position of said cam by the movement of the gears of this train, as is best shown in Figs. 5, 8 and 9.

*Cam and crank driving gears and adjustment*

The adjustment of the cam 50 and crank C, or its pin 52 (described hereinafter), by the lever 37 in relation to the driving mechanism operated by the bevel gear 22 and the parts moved thereby, are utilized to vary the cut-off and reverse the engine. This movement is accomplished by two trains of gears, each employing the same principle, one affecting the movement of the cam and the other affecting the movement of the crank, and operating on a differential principle.

Both trains of gears are driven by gear 53 which is fixed on a transverse shaft 54 journaled in the casing 1 and which is driven by a bevel gear 55, which is fixed thereon and which meshes with a bevel pinion 56 secured to the forward end of shaft 24 within the casing 1. These trains of gears are thus driven, through gear 53, shaft 54, gears 55 and 56 and the shafting 24, 25 and 23, by the main axle gearing within housing 7, previously referred to, and pinion 53 is thus rotated in direct relationship to the main axle and main pin 12 and the moving parts of the engine.

The cam is driven from gear 53 through gears 57, 58, and 59, the last mentioned being secured to the cam shaft 49. The gear 58 is mounted to revolve freely on a pin 60 secured in the end of arm 51, and gears 58 and 57 are held in mesh by a pair of links 61, one end of which is swingingly secured to the pin 60 and the other end of which is swingingly secured to a pin 62 on which gear 57 revolves. One end of another pair of links 63 is also swingingly secured to the pin 62 and the other end of this pair of links 63 is swingingly mounted on the shaft 54. The arm 51 and link pairs 62 and 63 thus form a jointed framework serving to hold the gears of the cam driving train in mesh while permitting a planetary adjusting movement for the purpose of altering the angular position of the cam gear 59 with relation to the pinion 53.

When lever 48 and its arm 51 are moved, the pins 60 and 62 are thus swung about the axial centers of the cam shaft 49 and the shaft 54 respectively and gear 57 rolls about pinion 53, this rolling movement being in turn communicated to gears 58 and 59. The angular movement of the cam shaft in relation to the angular movement of lever 48 is amplified, as may be seen by following the points on the pitch circles of the train of gears as follows:

Assuming the shaft 54 is stationary, the movement of the several gears by movement of the lever 48, and the pin 60 carried on its arm 51 from the position marked "center" to the position marked "ahead" (Fig. 8) moves the intermediate gear pair 58 and 57 from the full line positions of the figure to the dotted line positions as indicated, revolving the gears 58 and 57 about the adjacent meshing gears 53 and 59. Points D, E and F on the pitch lines move to the points D', E' and F', as shown in Fig. 8. Thus the point F' will have rotated from the point F about 150 degrees, while the lever 48 will have moved but 30 degrees and the cam will likewise have moved about 150 degrees, which is the total adjustment required, in the example illustrated, to vary the cut-off and to reverse the engine when taken together with the motion of the other train of gears and the movement of the crank pin 52. By this means adjustment of angular position of the cam or "$M^1$" movement referred to above may be effected, it being understood that adjustments for cut-off variation will be through lesser angles and need not involve adjustment of the crank or "$M^2$" movement. Movement of the arm 48 and associated parts may be limited conveniently either by stops within the casing 1 or by limiting movement of the external parts 47 or its connections.

The $M^2$ or crank movement may be followed by also assuming the gear 53 to be stationary and its adjusting lever 64 to be moved from the position shown in full lines to the position indicated by the broken center line. This lever 64 is operated through the part 30 by the air cylinder 28.

Gear 53 meshes with a gear 65, which meshes with a gear 66, which, in turn, meshes with a gear 67 secured to crank shaft 68 journaled in the casing 1, and is thus adapted to rotate the crank C. The lever 64 is swingingly and freely movable about or on the crank shaft 68 and is provided with a pin 69 on which the gear 66 revolves freely and on which one end of a pair of links 70 is swingingly mounted. The other end of this pair of links is swingingly secured to a pin 71 on which the gear 65 revolves freely and on which one end of a second pair of links 72 is swingingly mounted, the other end of this pair of links 72 being swingingly mounted on the shaft 54. The links 70 and 72 hold the gear 65 in mesh with its mates, operating similarly to the similar parts in the case of the cam, or $M^1$, train of gears.

When lever 64 is moved as described, points A, B and C on the pitch lines of the gears 65, 66 and 67 are moved to the positions or points A', B' and C'; thus a movement of about 30 degrees of the lever 64 and its pin 69 moves the point C to C' through an angle of about 130 degrees. The movement of the point C to C' rotates the crank shaft and crank pin 52 a like number of degrees with relation to gear 53 and adjustment of the amount of movement may be employed to adjust the lead of the valve 16. I have therefore provided stop lugs 73 and 74 in the casing 1, which engage the respective stop screws 75 and 76, which latter are threaded for the purpose of adjustment and carried by a tapped boss 77 on the lever 64. It will be understood that, while I have shown a crank having a pin 52 which does not include the axis of the crank shaft, the term crank is intended to include also an eccentric, or crank whose pin surrounds the crank shaft or includes its axis.

The amount of travel of the motion $M^1$ and the position of the points O and P (see Figs. 12, 13, and 14) on the surface of the cam 50, which points are at the ends of the high dwell of the cam, also affect the lead and when properly related to the movement of the lever 37 may be employed to cause the lead to be eliminated at or near the maximum travel of said lever or at the point of maximum cut-off.

It will be seen by referring to Fig. 14 that the cam has moved its rollers away from the position of Figs. 12 and 13, as they are no longer resting on the concentric surfaces of the cam but on the rise and fall arcs of the cam. The rollers thus have moved the valve back somewhat at the forward dead center position of the engine, due to the way in which the valve stem is connected, and as is described later. Thus the engine and its valve 16 are not only adjusted for the amount of lead by the screws 75 and 76 but the valve position may be changed from the desired lead at early cut-offs so as to eliminate the lead at maximum cut-off. This important feature makes the engine easy to start due to pre-admission of steam being eliminated when the cut-off is at its maximum.

While the above relation between the cam and crank and the shaft 54 which revolves both of them has been described assuming the shaft 54 to be stationary, this relationship, of course, will remain constant when the shaft 54 is rotating, and the crank and cam are retarded or advanced by the movement of the levers 48 and 64 when the engine is in motion.

Lever 64 moves only at the extremes of travel of the levers 37 and 29, while the cut-off may be varied to any degree within the limits of cut-off by the movement of the levers 37, 29 and 48. The lever 64 is moved only by the air cylinder 28 and because of the slot 31 and pin 33 moving the valve of the cylinder 28, as previously described, the piston 34, which operates during reversal, is not moved except at the extremes of travel of the lever 37.

*Cam and crank connections to the valve*

The $M^1$ and $M^2$ motions are combined in the operation of the valve 16 through the valve stem connection 15, as follows:

The cam 50 is operatively connected to move a follower beam 78 by means of cam follower rollers 79 and 80 rotatably mounted on the beam 78 and both of which are kept in contact with the surface of the cam by reason of its shape. The follower beam 78 is preferably guided at the rear end by a swinging link 81 and at the front end by swinging links 82 which support the beam 78, and are pivotally mounted at their lower ends in the casing 1. The cam movement is communicated to a combining lever 83 which is journaled near its center on a pin 83' carried by links 82. The bottom end of combining lever 83 is swingingly connected to the crank pin 52 by a connecting rod 84 and its top end is swingingly connected to a link 85, which passes out of the casing 1 and is swingingly connected to the upper end of a lever 86, pivotally mounted on the engine frame at 86', and swingingly connected at its lower end to the valve stem connection 15.

The combining lever 83 is moved at its center by the cam motion M¹ and at its bottom end by the crank motion M², thereby combining the two motions and imparting the combined motion to the engine valve. It should be borne in mind in considering the cam and crank movements and ellipse diagrams of the valve movement that the lever 86 reverses the direction of the travel of the valve as compared with that of the link 85, since a forward movement of its upper end causes a backward movement of its lower end.

Alternative modes of connection of the combining lever 83 may be readily employed where found desirable due to the structure of existing engines, crank error correction or similar considerations. One such connection is indicated in Fig. 3, and involves simply the direct connection of valve stem 17 to the lever 83 by a link 15'. Another such connection is indicated in Fig. 3A and involves connecting lever 83 through a link 15'' to an intermediate point H of a lever F—H—G which is pivoted at its upper end F and connected to the valve stem 17 by a link 15—G at its lower end G. In either of these cases the movement of lever 83 will not be reversed, and as will be understood, the cam and crank will be adjusted accordingly.

Operation

The operation of the valve gear of the invention will be best understood from Figs. 12 to 14 and 12A to 14A, previously referred to in a general way. It will be understood that the cam and crank in these figures are rotating in a clockwise direction and at the same angular speed, being driven from a common drive within the valve gear casing by the trains of gears previously referred to, and the motions produced by the crank and cam are combined and communicated to the link 85 and ultimately through the mechanisms described to the valve. In the following description, the resultant movement communicated to the valve is to be understood as the movement referred to when discussing either the cam or the crank or the conjoint effect of the two.

The crank produces a crank movement which is harmonic in nature except for crank error, and requires no further discussion. A cam of preferred form according to the invention, has a concentric high portion or arc U and a concentric low portion or arc V, both bounded by the diameters O and P, which lines may serve to indicate the angular positions of the cam in the respective Figures 12, 13 and 14. The rise and fall portions X and W of the cam are preferably designed with a view to minimizing shock and vibration. A suitable cam for use in valve gear according to the invention may be laid out in various ways, among which the following has been found convenient. The extent of cam movement desired, cam roller dimensions and positioning and the cam roller supporting link or slide structure having been determined, the arcuate extent of the high and low points U and V is fixed upon with reference to the desired cycle of valve gear operations and further mechanical considerations adverted to below, so that the only remaining feature to be determined is the conformation of the rise and fall arcs X and W. One suitable form for the rise and fall portions of a cam such as that employed in the valve gear of the invention is an approximately harmonic gravity curve. Where such a curve is employed it may be developed by moving the cam rollers through determined distances for various relative angular displacements of the cam in the following manner: Starting with the rise and fall portions just coming into contact with the cam rollers, and remembering that the speed of rotation of the cam is constant, the rise and fall arc is traversed in equal angular increments and the cam rollers are positioned so as to have a gravity motion following the laws of falling bodies, which is to say, the cam is constantly accelerated and then constantly decelerated. By following this method, the rise and fall curves may be determined with any degree of accuracy desired and contact of both rollers with the cam insured at all times.

It is desirable in designing valve gear according to the present invention to produce a major part of the valve movement by means of a crank rather than a cam, because of the superior mechanical characteristics of a crank movement. As will be apparent to those familiar with the art, the crank movement, according to the invention, presents certain analogies to the lap and lead movement of the conventional gear and the cam movement presents certain analogies to the travel movement of such gears. It should be noted, however, that in the present invention the crank may produce (and does in the example chosen as illustrative) not only the lap and lead motion of the valve but a considerable portion of the travel thereof beyond lap and lead. The cam produces a portion of the travel movement and also serves to accelerate and decelerate the valve at various points in its cycle of movements, so as to vary the cut-off. In the case chosen as illustrative, the crank produces about 80% of the entire valve movement and the cam about 20%.

The extent of the high and low dwells U and V may be determined with reference to service conditions and has been found in various examples considered to be about 120°, when considering the valve cycle from the thermodynamic point of view. With such an extent of cam dwells, cut-off regulation may be achieved without variation in valve travel.

Under severe service conditions, however, it may be found desirable to modify the cam construction from that dictated by purely thermodynamic considerations. For example, it may be found convenient to tolerate some variation in valve travel introduced by lengthening the rise and fall arcs of the cam for the purpose of reducing vibration in the valve gear. In one such valve gear designed for high speed and heavy duty service, a cam having dwells of about 104° has been found suitable. It will be understood that this extent of cam dwell is not critical as the dwell might well be different with somewhat different sized cam rollers than those employed or a somewhat different relationship between the cam and crank movements. In the case referred to, the valve gear is designed to reciprocate a valve weighing about 250 pounds as fast as about four times per second, which represents very severe service conditions.

Modification of the cam from purely constant travel conditions may also prove desirable from the standpoint of engine performance apart from the valve gear. As is well known, it is necessary in engines employing valve gears of conventional design to throttle down at low cut-offs and it is one object of the present invention to make such throttling down less necessary by improving the valve events at such cut-offs. Such improvement may take the form of a sharp cut-off, reducing wire drawing, and a substantially constant and late release at all running cut-offs. As will be apparent to those skilled in the art, however, even with such improved characteristics of the valve cycle, the full port opening may not be desirable at early cut-offs due to the strain upon the engine parts themselves, as distinguished from the valve and valve gear. By limiting the dwells U and V it becomes possible to reduce the travel at early cut-offs to any desired extent dictated by requirements of particular service conditions.

The reduction in valve travel at early cut-offs just referred to must be carefully distinguished from that present inconventional valve gears. For one thing, the sharp cut-off and late release conditions referred to should be borne in mind and, moreover, it will be noted that the steam port opening at early cut-off is still far in excess of the lead, a thing which is not true in conventional valve gears. It should further be noted that (as may be seen in the diagrams of Figs. 12A to 14A), with the valve gear of the invention, even where the travel is reduced somewhat at early cut-offs, the ratio between valve travel or port opening and cut-off, expressed either in inches or percent, actually can be made to increase at early cut-off as compared with full cut-off.

Considering now the state of affairs at engine dead center, as distinguished from the conditions obtaining at cut-off, release and maximum port opening, previously discussed, it will be noted that with the mechanism of the invention constant lead could be obtained, if desired, by having the same dwell of the cam in contact with a given cam roller in the various positions of Figures 12 to 14, in which the crank, as previously stated, is in the position occupied when the engine is on forward dead center. The elimination of lead at full cut-off, with the important advantages resulting therefrom, is obtained by proportioning the cam and interrelating the parts so that at full cut-off (Figure 14) the dwell U, which was in contact with cam roller 80 at early cut-offs, has passed off this roller, which is now in contact with the falling portion W. The resulting cam displacement suffices to eliminate the lead at full cut-off. As is apparent from Figures 12 to 14 and 12A to 14A, the reversal of the parts for reverse operation of the engine will produce exactly the same conditions when operating in reverse and in particular will result in the elimination of lead at full gear cut-off in reverse and constant lead at running cut-offs, as distinguished from an undesirable condition in which reversal of the engine would result in increasing the lead with increasing cut-off.

In the example illustrated, it has been found possible to maintain constant lead up to, say, 78% cut-off, whether in forward or reverse, and to decrease the lead abruptly thereafter to a point where the engine operates "blind" or without lead at full gear cut-off, which in this case is about 87%. It will thus be observed that lead has been maintained constant through all running cut-offs and up to about 90% of full gear cut-off, but has been eliminated at full gear cut-off.

The valve ellipse producible by a gear according to the preferred embodiment of the invention has a characteristic appearance at early cut-offs in that it has the shape of elliptical arcs extending from the dead center positions slightly past the cut-off but centered about different axes and these arcs are connected by smooth, rather flat curves. To put this somewhat differently, the ellipse diagram produced is convex near the ends and has inflection points slightly past the cut-off positions.

The effect on the valve of varying the cut-off according to the invention, is to accelerate the average velocity of the travel beyond lap and lead as the cut-off is reduced and to decelerate the lap and lead movement. By a proper combination of this deceleration and acceleration, the release point may be kept substantially constant at running cut-offs, so that early release is avoided. Similarly compression is kept substantially constant so that it does not increase at early cut-off.

The $M^1$ motion causes a quick movement at and near the end of the valve travel thereby causing a relatively accelerated movement of the valve at the time its important events occur, such as admission and cut-off, and also causes the valve not only to open and close more rapidly but also to provide a wider port opening, and thus reduces wire drawing and permits the steam to enter the cylinder at early cut-offs at high speed. As is apparent from the foregoing discussion, and particularly from Figs. 12A to 14A, important advantages are thus obtained, both in the character of the valve events and in the relation or timing of these events with respect to the engine.

What is claimed is:

1. In a valve gear, and in combination, a cam movement and a crank movement and combining means for operatively connecting the said movements to a valve, the said cam movement comprising a cam and a train of gears including a movably mounted intermediate gear pair for driving the same, and comprising also control means for revolving said intermediate gear pair about adjacent gears to advance and retard the said cam movement.

2. In a valve gear, and in combination, a cam movement and a crank movement and combining means for operatively connecting the said movements to a valve, the said crank movement comprising a crank and a train of gears including a movably mounted intermediate gear pair for driving the same, and comprising also control means for revolving said intermediate gear pair about adjacent gears to advance and retard the said crank movement.

3. In a valve gear, and in combination, a cam movement and a crank movement and combining means for operatively connecting the said movements to a valve, the said cam movement and crank movement comprising a common drive gear and gear trains connecting said cam and crank thereto, and comprising also control means for revolving an intermediate pair of each said gear train about adjacent gears to advance and retard the said cam movement and crank movement.

4. In a valve gear for steam engines, and in combination, means for producing a lap and lead motion, means for producing an additional travel motion, and control means for adjusting the first said means to reverse the engine.

5. A valve gear according to claim 4, comprising also means for adjusting the second said means to adjust the cut-off.

6. A valve gear according to claim 4, in which the said control means is movable between predetermined limits, and comprising also means for varying the said limits so as to vary the lead.

7. In a valve gear for piston valves, and in combination, a rotatable cam and reciprocable follower member, the said cam having concentric high and low dwells and rise and fall portions connecting said dwells, a crank and connecting rod, combining means for connecting said follower member and connecting rod to a valve stem, drive means for rotating said cam and crank, and control means for rotatably advancing and retarding said cam relative to said crank through a predetermined angle to vary the cutoff, the said rise and fall portions being of sufficient angular extent to provide an uninterrupted combined movement in each direction of reciprocation and at all positions of said cam within said predetermined angle.

8. A valve gear according to claim 7, in which the said rise and fall portions follow curves developable from a substantially harmonic motion of said follower member.

9. A valve gear according to claim 7, in which the said rise and fall portions follow curves developable from a substantially gravity motion of said follower member.

10. A valve gear according to claim 7, in which said control means comprise means for positioning said cam with said dwells in actuating relation to said follower member at running cut-offs when said crank is in position corresponding to engine dead center, and positioning said cam with said rise and fall portions in actuating relation to said follower member at full gear cut-off when said crank is in position corresponding to engine dead center, whereby said valve gear operates at a substantially constant lead at running cut-offs and substantially without lead at full gear cut-off.

11. A valve gear according to claim 7, in which said control means comprise means for positioning said cam with said dwells in actuating relation to said follower member when said crank is at dead center position, at full gear and late cut-offs, and positioning said cam with said rise and fall portions in actuating relation to said follower member when said crank is at dead center position, at early cut-offs, whereby approximately constant valve travel is maintained, and port opening is substantially reduced at early cut-offs.

12. A valve gear according to claim 7 in which said control means comprise means for bringing said rise and fall portions into actuating relation with said follower member at predetermined angular positions of the said crank for varying cut-off while maintaining the said dwells in actuating relation to said follower member at another predetermined angular position of the said crank, whereby cut-off regulation throughout running cut-offs is obtained without producing substantially earlier release and compression at earlier cut-offs.

13. In a valve gear for piston valves, and in combination, a rotatable cam and reciprocable follower member, a crank and connecting rod, combining means for connecting said follower member and connecting rod to a valve stem, drive means for rotating said cam and crank and control means for advancing and retarding said cam and crank, respectively, to vary the cut-off and reverse an engine.

14. A valve gear according to claim 13, in which the said control means comprise differential gear trains connecting said drive means to said cam and crank and means for adjusting said differential trains to vary the cut-off and reverse an engine.

15. In a valve gear, and in combination, a cam movement and a crank movement, combining means for operatively connecting the said movements to a valve and control means for advancing and retarding the said cam movement with relation to the said crank movement for regulating cut-off, all the foregoing being arranged and dimensioned with respect to one another to produce an uninterrupted combined movement in each direction of reciprocation and characterized by an ellipse diagram at early cut-offs which is composed of substantially elliptical arcs extending from dead center to slightly past the cut-off points, centered about different axes and connected by smooth, relatively flat curves.

16. A valve gear according to claim 15, in which the said combined movement is further characterized by a substantially constant lead at running cut-offs and substantially no lead at full gear cut-off.

17. A valve gear according to claim 15, in which the said combined movement is further characterized by a substantially constant lead at cut-offs up to about 90% of full gear cut-off, a decreasing lead thereafter, and substantially no lead at full cut-off.

18. A valve gear according to claim 15, in which the said combined movement is further characterized by decreased travel but increased ratio between travel and cut-off, at early cut-offs as compared with full gear cut-off.

CHARLES E. HATHAWAY.